Jan. 1, 1935.  E. E. HEWITT  1,986,475
VALVE DEVICE
Original Filed July 7, 1932

INVENTOR
ELLIS E. HEWITT
BY *Wm. M. Cady*
ATTORNEY

Patented Jan. 1, 1935

1,986,475

UNITED STATES PATENT OFFICE 1,986,475

VALVE DEVICE

Ellis E. Hewitt, Edgewood, Pa., assignor to The Westinghouse Air Brake Company, Wilmerding, Pa., a corporation of Pennsylvania Original application July 7, 1932, Serial No. 621,238. Divided and this application March 2, 1933, Serial No. 659,257

12 Claims. (Cl. 251—131)

This invention relates to valve structures and particularly to cut-off valves such as are employed in branch pipes of fluid brake equipment for controlling the supply of fluid under pressure from the brake pipe to the brake controlling valve device, the present application being a division of application Serial No. 621,238, filed July 7, 1932.

An object of the invention is to provide a cut-off valve device that may be combined with a dirt collector device such as that disclosed in the original application, so that the casing of such device constitutes a part of the enclosure for the valve of the cut-off valve device.

A further object of the invention is to provide a valve of the diaphragm type wherein the diaphragm is provided with an annular under-cut seat rib for engaging a flat annular seat surrounding a fluid passage, whereby the fluid under pressure acting on the inner under-cut wall of the seat rib, forces the rib into engagement with the seat and thereby assists in maintaining a fluid tight seal when the valve is in closed position.

A further object of the invention is to provide a simple, inexpensive and positive means for operating the valve diaphragm to open and closed positions.

Figure 1:
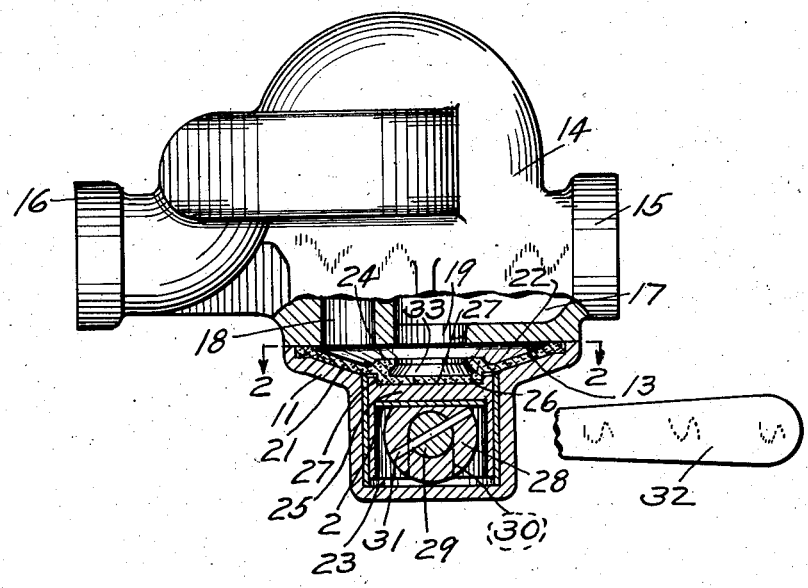
Figure 2:
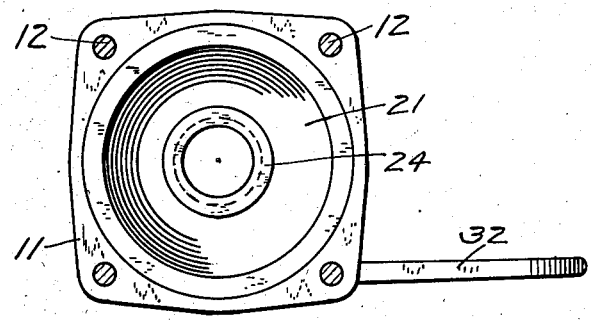

These and other objects of the invention that will be made apparent throughout the further description thereof, are attained by means of the fluid brake equipment hereinafter described and illustrated in the accompanying drawing; wherein Fig. 1 is a vertical sectional view, partly in side elevation, of a fluid brake equipment embodying features of the invention; and Fig. 2 is a top plan view of the lower section of the valve casing and diaphragm.

Referring to the drawing, the cut-off valve device comprises a casing 11, that is secured by means of bolts 12 to the attaching face 13 of a dust collector casing 14, such as is disclosed in the above mentioned application. The casing 14 is provided with the usual inlet and outlet connections 15 and 16, respectively, which communicate with the brake pipe and brake controlling valve devices (not shown) respectively, and with the inlet passage 17 and outlet passage 18, respectively, of the dirt collector casing.

The attaching face 13 of the dirt collector casing is provided with a flat surface surrounding a passage 19 opening from the inlet passage 17, and which constitutes a flat seat for cooperating with a diaphragm valve for closing communication between the inlet passage 17 and the outlet passage 18.

The casing 11 contains a diaphragm type valve 21, and has a chamber 22 on one side and a chamber 23 on the opposite side, the said diaphragm being provided with an under-cut annular seat rib 24 that is adapted to be moved into engagement with the face 13 of the casing 14 and to close the opening 19 in the passage 17 that is open to the connection 15 of the casing 14. The diaphragm valve 21 is adapted to be clamped between the casing 11 and the attaching face 13 of the dirt collector casing 14.

The diaphragm valve is manually operable by means of a plunger 25 slidably mounted within the chamber 23 and which engages a centering projection 26 on the outer face of the diaphragm valve 21. The projection fits into a shallow recess 27 in the inner face of the plunger 25. The plunger is moved toward the diaphragm by a cam 28 fixed upon a shaft 29 by a pin 31, the shaft extending through oppositely disposed slots 30 in the plunger 25 (one of which is shown) and through the casing 11, and exteriorly of the casing 11, the shaft is provided with a manually operable handle 32.

When the shaft 29 is rotated by means of the operating handle, the plunger is forced inwardly by the cam which engages a hardened plate 2 on the plunger and the seat rib 24 is positively forced into sealing engagement with the face 13 of the casing 14, thereby closing communication between the passages 17 and 18. The annular seat rib 24 of the diaphragm valve 21 being under-cut, fluid pressure in the recess 33 in the diaphragm valve supplied from the brake pipe through passage 19, acts upon the under-cut wall of the rib 24 and forces the rib against the seat face 13 surrounding the opening 19, and assists in maintaining a fluid tight seal. This valve is closed when it is desired to cut out the associated brake controlling valve device. The valve is held closed so long as the circular portion of the cam 28 engages the plate 2 of the plunger.

While but one embodiment of the improved cut-off valve device is disclosed as applied to a dirt collector for fluid brake equipment, it is obvious that the valve device is applicable to a variety of fluid controlling devices and that changes may be made in the construction without departing from the spirit of the invention.

Having now described my invention, what I claim as new and desire to secure by Letters Patent, is:

1. A diaphragm valve comprising a disc of flexible material having an integral annular seat engaging under-cut rib on one face.

2. A diaphragm valve comprising a disc of flexible material having a recess on one face surrounded by an annular under-cut flexible sealing seat.

3. A diaphragm valve comprising a flexible diaphragm having an integral annular under-cut seat engaging rib for making sealing engagement with a valve seat whereby fluid under pressure acting on the under-cut portion of said rib assists in forcing it into engagement with said seat.

4. A diaphragm valve adapted to be subjected upon one side to fluid under pressure comprising a flexible diaphragm having an integral annular seat rib on the side of the diaphragm subject to fluid pressure, the said rib having a wall under-cut and adapted to be acted upon by fluid under pressure for assisting in forcing said rib into engagement with said seat.

5. A diaphragm valve comprising a flexible diaphragm subject to fluid under pressure on one side for making sealing engagement with a valve seat, and having a recess on one side and an integral annular flexible sealing rib surrounding said recess and of smaller diameter than said recess and having its inner wall subject to fluid under pressure within said recess for assisting in forcing said rib into engagement with said seat.

6. A diaphragm valve device comprising a seat and a flexible diaphragm for making sealing engagement with said seat and adapted to be subjected on one side to fluid under pressure and having on said side an annular seat rib for engaging said seat and surrounding a recess in said diaphragm and defining an opening into said recess of less cross-sectional area than the major cross-sectional area of said recess, so as to provide a wall on said rib adapted to be acted upon by said fluid under pressure within the recess to assist in forcing the rib into sealing engagement with a valve seat.

7. In a diaphragm valve device, the combination with a casing having a valve chamber and an opening through which fluid under pressure may flow into said chamber and a valve seat surrounding said opening, and a diaphragm valve within said chamber, of a flexible under-cut annular seat rib carried by said diaphragm adapted to engage said seat and to be pressed into sealing contact therewith by fluid under pressure supplied through said opening.

8. In a diaphragm valve device, the combination with a casing having a valve chamber and an opening through which fluid under pressure may flow into said chamber and a valve seat surrounding said opening, of a diaphragm valve within said chamber having a recess opposite said opening surrounded by an annular under-cut seat rib having an inwardly inclined flexible inner wall subject to fluid under pressure supplied to said recess through said opening and adapted to be forced into sealing engagement with said seat by the assistance of the pressure of said fluid, and means for moving the said diaphragm so as to move said seat rib into sealing engagement with said seat.

9. In a diaphragm valve device, the combination with a casing having a valve chamber and an opening through which fluid under pressure may flow into said chamber, a valve seat surrounding said opening and a diaphragm valve within said chamber and cooperating with said seat for closing said opening, of a means on said diaphragm valve adapted to be acted upon by fluid under pressure supplied through said opening when the valve is in engagement with its seat for forcing a portion of said diaphragm in sealing engagement with said seat.

10. In a diaphragm valve device, the combination with a casing having a valve chamber and an opening through which fluid under pressure may flow into said chamber, a valve seat surrounding said opening and a diaphragm valve within said chamber and cooperating with said seat for closing said opening, of means for forcing said diaphragm valve into sealing engagement with said seat and for releasably holding said diaphragm in seated position, and means acted upon by fluid supplied through said opening while said diaphragm valve is seated for increasing the force with which said diaphragm valve is forced into sealing engagement with said seat.

11. In a diaphragm valve device, the combination with a casing having a valve chamber and an opening through which fluid under pressure may flow into said chamber, a valve seat surrounding said opening and a diaphragm valve within said chamber having a flexible under-cut annular seat rib adapted to engage said seat and to be pressed into sealing contact therewith by fluid under pressure supplied through said opening, and means for moving said diaphragm into engagement with said seat and for supporting it against the fluid under pressure acting thereon for preventing the fluid under pressure from forcing said diaphragm to open position.

12. In a diaphragm valve device, the combination with a casing having a valve chamber and an opening through which fluid under pressure may flow into said chamber, a valve seat surrounding said opening and a diaphragm valve within said chamber having a flexible under-cut annular seat rib adapted to engage said seat and to be pressed into sealing contact therewith by fluid under pressure supplied through said opening, and means for supporting said diaphragm opposite said annular seat rib and for moving said diaphragm into sealing engagement with said seat.

ELLIS E. HEWITT.